United States Patent [19]

Gazzaz

[11] Patent Number: 4,916,437
[45] Date of Patent: Apr. 10, 1990

[54] GAS MONITORING SYSTEM WITH LEAK DETECTION AND FLOW CUTOFF

[76] Inventor: Hesham H. Gazzaz, POB 7932, Jeddah 21472, Saudi Arabia

[21] Appl. No.: 280,369

[22] Filed: Dec. 6, 1988

Related U.S. Application Data

[63] Continuation-in-part of Ser. No. 85,195, Aug. 14, 1987, abandoned.

[51] Int. Cl.⁴ .............................................. G08B 17/10
[52] U.S. Cl. ............................... 340/632; 251/129.01; 73/40.5 R; 73/23
[58] Field of Search ........................... 340/632–634; 73/1 G, 23, 40, 405 R; 251/70, 129.01, 129.22

[56] References Cited

U.S. PATENT DOCUMENTS

| | | | |
|---|---|---|---|
| 3,678,489 | 7/1972 | Scherban et al. | 340/633 |
| 3,815,114 | 6/1974 | Johnson et al. | 340/633 |
| 3,879,717 | 4/1975 | Gruensfelder | 340/634 |
| 3,955,186 | 5/1976 | Green et al. | 340/634 |
| 4,068,522 | 1/1978 | Poe | 73/40.5 R |
| 4,098,284 | 7/1978 | Yamada | 251/70 |
| 4,170,770 | 10/1979 | Ichinose et al. | 340/634 |
| 4,219,806 | 8/1980 | Enemark | 340/632 |
| 4,223,692 | 9/1980 | Perry | 340/634 |
| 4,263,928 | 4/1981 | Kobayashi | 251/129.01 |
| 4,623,876 | 11/1986 | Shima et al. | 340/539 |
| 4,766,762 | 8/1988 | Tsan | 73/40 |

*Primary Examiner*—Joseph A. Orsino
*Assistant Examiner*—Jill D. Jackson
*Attorney, Agent, or Firm*—Walter C. Farley

[57] ABSTRACT

A gas monitoring system for a kitchen environment in a house and the like which is supplied with gas from a pressurized gas container or from a public gas supply to sense a possibly occurring gas leak. The system comprises a valve controlling the flow of gas from the container to a cooking range. Leaked gas is detected by a sensor which activates a visual and an audible alarm circuit and which operates a valve to terminate gas flow. The electronic alarm circuit is an integrated circuit, so that it can be located in a small hermetically sealed container, together with the power supply. The alarms stay on even after the gas leaked has been removed, until the system is reset by a manual switch. A manual override is provided to allow gas flow in the event of power failure or system failure in areas where service may be delayed.

7 Claims, 5 Drawing Sheets

GAS MONITORING SYSTEM WITH LEAK DETECTION AND FLOW CUTOFF

CROSS-REFERENCE TO RELATED APPLICATION

This is a continuation-in-part of application Ser. No. 085,195 filed Aug. 14, 1987, and now abandoned.

The invention relates to a gas monitoring system for use in conjunction with a kitchen environment as in homes, mobile homes and restaurants and, more particularly, to a gas monitoring system to protect life and property in case of gas leaks from a source of combustible gas such as a pressurized gas container, but which has provision for use of the gas under emergency conditions.

BACKGROUND OF THE INVENTION

One known type of monitoring system for the detection of a gas leakage is disclosed in U.S. Pat. No. 3,955,186. The electric circuitry used in this safety system applies a combination of solid state devices, mechanical relays and switches. Such relays and switches are expensive, heavy in weight, take up much space and require extensive wiring. Moreover, as they enter into operation only rarely they are sources of faults and malfunctions. The system makes use of a multivibrator to supply the heater of the gas sensor rated at 0.5 volt with short duration current pulses with a mark space ratio of 50:1. This means a peak power of approximately 24 W which constitutes a considerable loss for the power supply.

Gas monitoring systems designed to provide protection against fires and explosions caused by uncontrolled gas leakage in kitchens and other places using gas as a source of energy must employ a magnetic valve to shut-off gas flow by means of a gas sensor. To obtain full security and protection at all times, the valve must be closed under normal conditions and energized to the open position by a very small current. If the system does not operate due to an electrical or a system failure, the valve remains closed, stopping gas flow from its source and creating a big problem for the user as he is left without gas and energy until the power is restored or until a qualified technician repairs the system. This problem is especially severe in areas where gas is often the only source of energy and where repair due to remoteness of places can take several days.

SUMMARY OF THE INVENTION

Therefore, it is an object of the invention to shut off the gas supply from the source in case of a leak, before the gas/air mixture forming can reach the lower explosion limit.

Another object is to provide a monitoring system with an override screw to manually allow gas flow without interruption in the event of the system failure or power loss, avoiding the need for such additional equipment as rechargeable batteries A further object of the invention is to equip the monitoring system with electronic circuits which are light in weight, require little wiring and are reliable in operation over long periods of time. The circuits should take up so little space that they can be located together in a small sealed container.

A further object of the invention is to avoid a high load on the power supply of the system.

According to the invention, the gas monitoring system comprises a gas valve controlling the flow of gas from the combustible gas source, the flow being remote-controlled by a solid state switch. An integrated electronic alarm circuit is responsive to a sensor for the detection of the presence of leaked gas. The integrated alarm circuit includes a visual alarm circuit and an audible alarm circuit with an audio oscillator. The integrated alarm circuit includes circuit drivers to drive the oscillator and the solid state switch A voltage comparator drives, in turn, the circuit drivers. A direct current power supply is provided for the sensor and the integrated alarm circuit. The system is set and reset by a switch after removal of the leaked gas. A manually operable override permits the user to open the valve by mechanical operation to allow unprotected gas flow in emergency conditions.

BRIEF DESCRIPTION OF THE DRAWINGS

The invention will now be described in greater detail by way of example with reference to the drawings, in which.

DESCRIPTION OF THE PREFERRED EMBODIMENT

Figure 1:
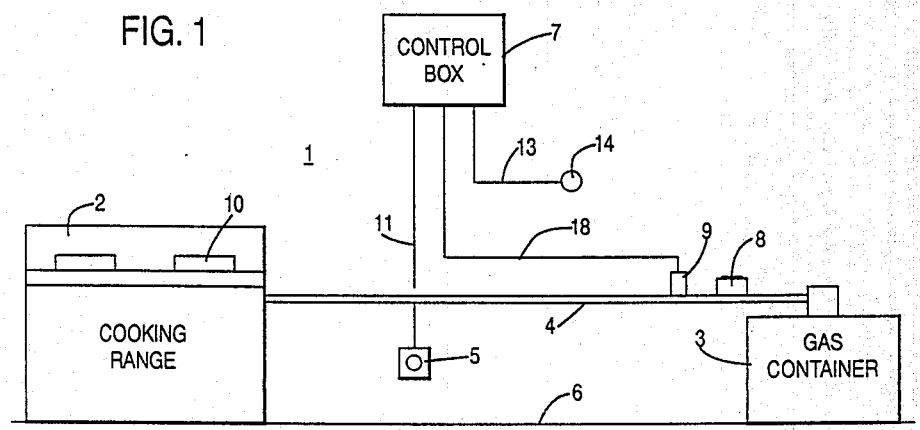
FIG. 1 shows schematically a kitchen in which the gas monitoring system has been installed.

Referring to FIG. 1, a kitchen 1 includes a cooking range 2 connected to a pressurized combustible gas container 3 by means of a gas pipe 4, a gas sensor 5 is near the kitchen floor 6, where leaked gas is likely to accumulate first, and a control box 7 is mounted in a convenient location The gas pipe is provided with a pressure regulator 8 and an electromagnetic gas shut-off valve 9 to control the flow of gas through the pipe from the container to the burners 10 of the cooking range. The gas sensor is connected to the control box 7 by means of an electric cable 11.

The electromagnetic gas valve 9 is of a known type. Its armature has the form of a valve stem carrying a valve body which cooperates with a seat to control the flow of gas through the valve. The valve is connected in an electronic circuit such that, in normal or fresh-air operation, the solenoid of the valve is energized, so that the valve stem is pulled upwards keeping the valve body away from the seat and allowing the fuel gas to pass from the gas container to the burners of the cooking range.

The gas sensor 5 is also of a known type, for example, Type TGS 813/813 C of Fiagaro Engineering, Inc., Japan. This sensor is a general purpose sensor with high sensitivity to methane, propane and butane. The sensor has low sensitivity to noise gases, such as gases resulting from the home environment, such as hair sprays and cooking fumes, thus reducing considerably the problem of false alarms. The gas sensing element of the sensor is bulk semiconductor material composed mainly of tin dioxide deposited on a ceramic tube. The heater of the sensor is located within the tube. As is known in the art, when a combustible gas such as propane or methane comes into contact with the sensing element, its electrical resistance, which is large in fresh air, decreases in accordance with the concentration of the gas in the air. The sensor is adjusted to a predetermined sensitivity by the manufacturer.

Figure 2:
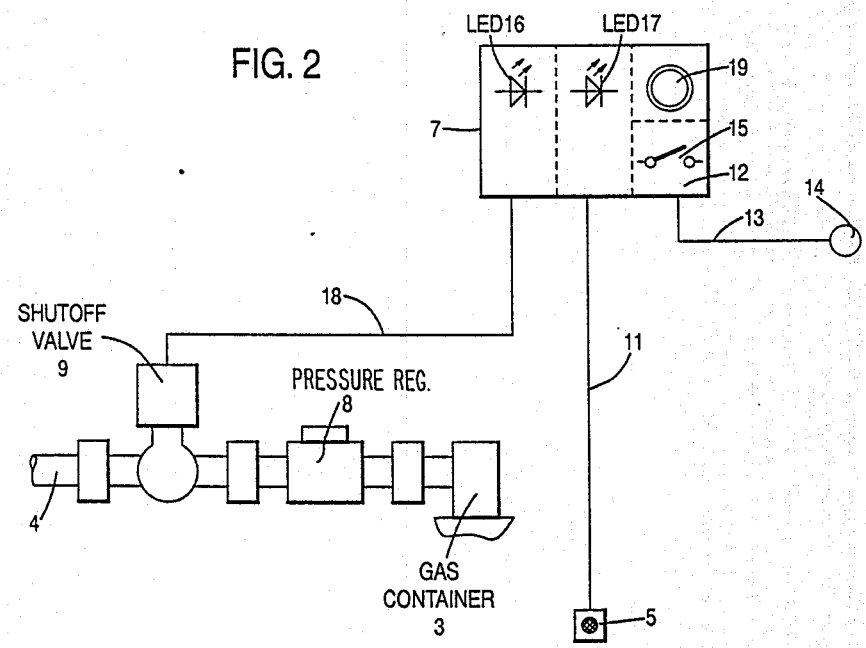
FIG. 2 shows a block diagram of the system.

Referring to FIG. 2, the control box 7 contains a direct current power supply 12, which is connected by means of an electric cable 13, is to an outlet 14 of the alternating current mains of the building wherein the kitchen is located. The monitoring system is turned on and off by means of a manual switch 15 of the power supply. Further, the control box contains circuitry to activate a visual alarm in the form of a green light emitting diode LED 16 which lights up when no gas leakage occurs, and a red LED 17, which lights up when the sensor has detected a gas leak and the gas supply has been shut-off by the gas valve. The gas valve is connected to the control box by means of a conductor 18. The control box further contains circuitry to operate an audible alarm in the form of a buzzer 19, at the same time that the red LED 17 lights up. Both LED's, the buzzer and the manual switch are located at the front of the control box. The control box is hermetically sealed so that no vapors, such as cooking fumes, dust and bugs can reach the electronic parts causing malfunction.

Figure 3:
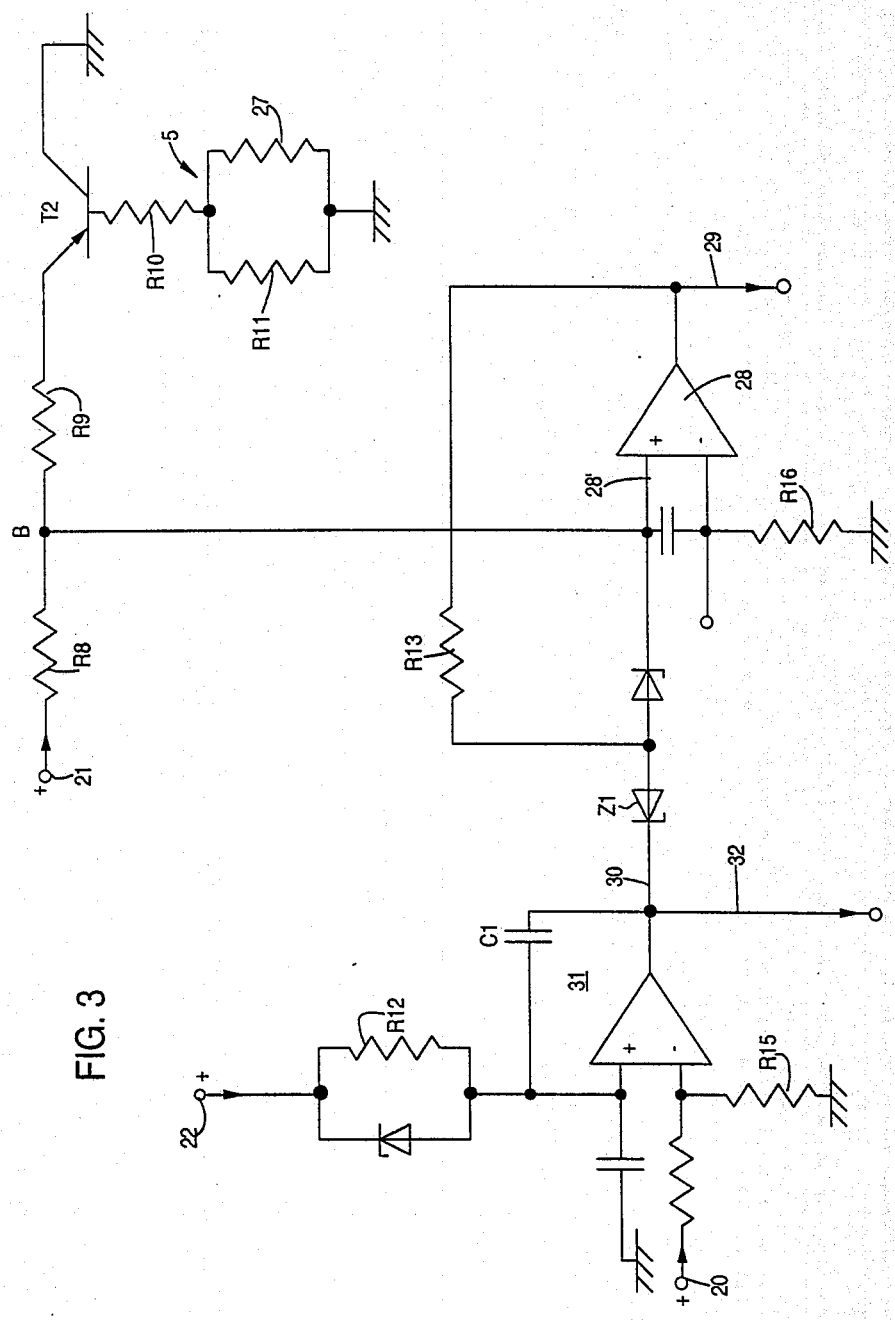
FIG. 3 shows a diagram of the sensing and oscillator circuit.
Figure 4:
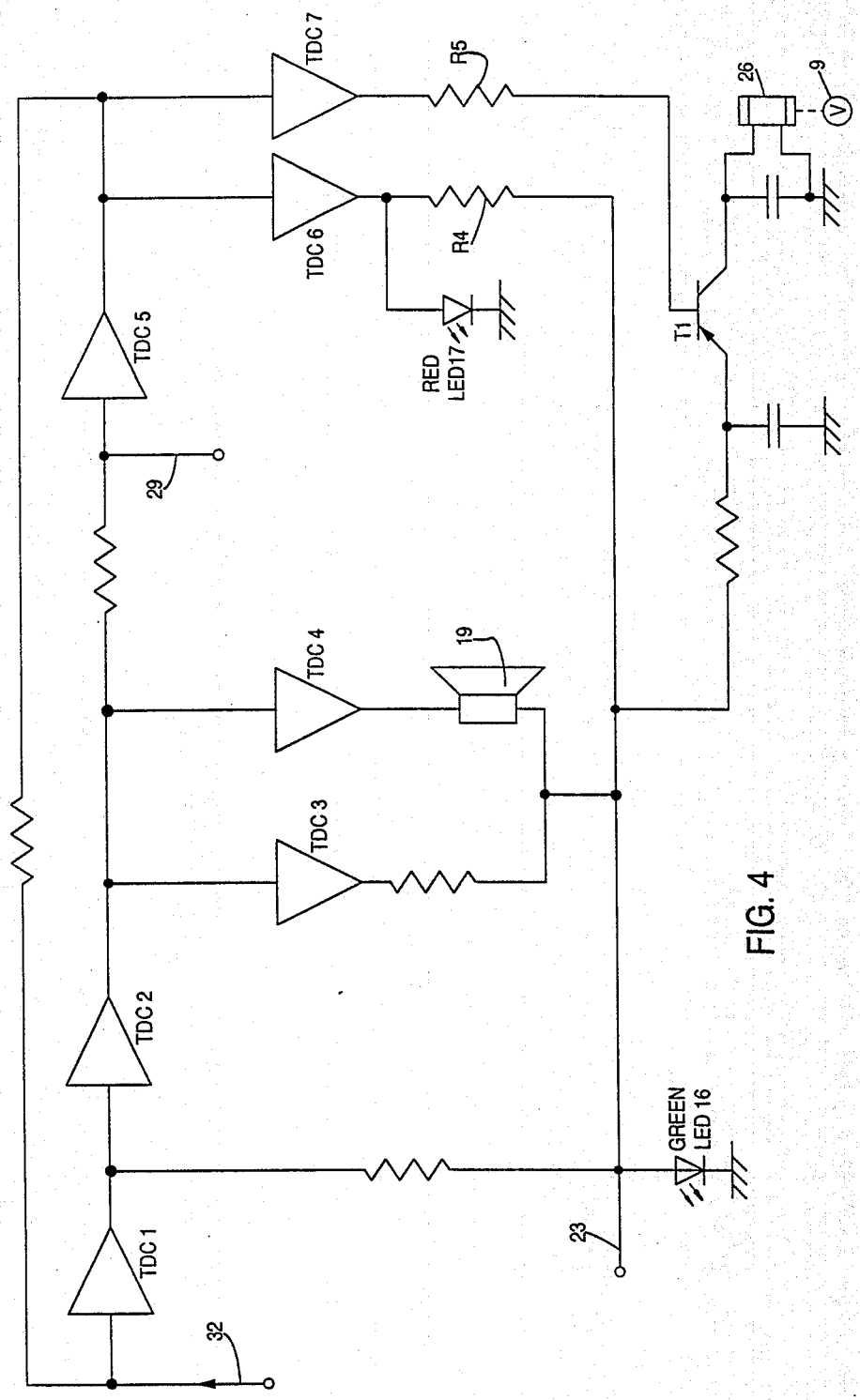
FIG. 4 shows the diagram of the alarm and gas shut-off circuit.
Figure 5:
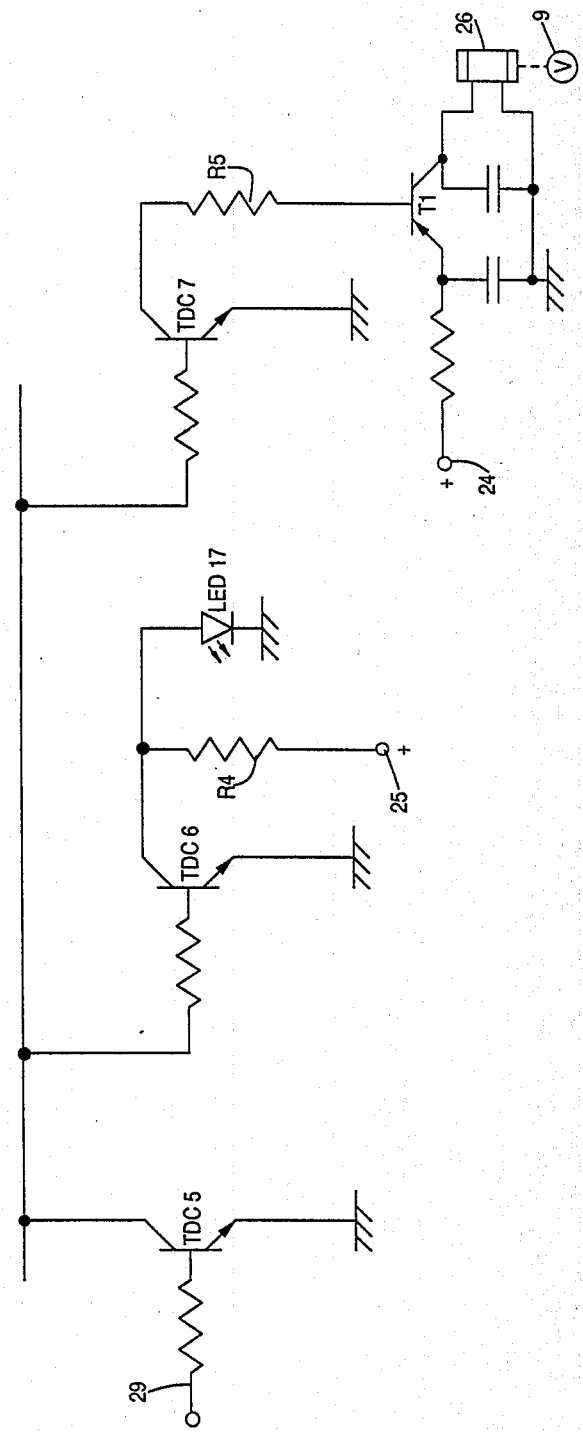
FIG. 5 shows a diagram of a detail of the alarm circuit to explain the operation of the alarm circuit.

The operation of the gas monitoring system is as follows, referring to FIGS. 3–5: When the system is turned on by closing the switch 15 on the control box, the power supply produces a regulated voltage at the input terminals 20 and 21 of the sensor and the audio oscillator circuit 31 (FIG. 3), an unregulated voltage at the input terminal 22 and at the input terminal 23 of the alarm and gas shut-off circuit (FIG. 4) and at the input terminals 24 and 25 in FIG. 5. The green LED 16 is lit and the solenoid 26 of the gas valve is energized by the circuit including resistor R7 and power transistor T1, thus opening the gas valve. The heater 27 of the sensor starts to warm up via resistors R8 and R9, transistor T2 and resistor R 10, until it reaches its state of steady operation. At the start, the resistance of the heater being small, the current will be large. As a result, the potential at point B, between resistors R8 and R9, which is connected to the non-inverting terminal 28' of an integrated circuit voltage comparator 28, decreases. This in turn results in a decrease in the output voltage of the comparator to $V_{cs}<V_{cn}$, $V_{cs}$ being the voltage at the start and $V_{cn}$ the voltage during normal operation.

The output $V_{cs}$ of the comparator is applied to the input 29 (FIG. 4) of transistor amplifier TDC 5. Its loads, transistor amplifier TDC 6 and TDC7 in Darlington connection (FIG. 5), and now being in the semi-off state, constitute large resistance to transistor amplifier TDC 5. The output of TDC 5 as applied to the inputs of transistor amplifier TDC 6 and TDC 7 will be low, so that these turn off completely. With transistor amplifier TDC 6 being off, current flows from the unregulated terminal 23 (FIG. 4) through resistor R4 and the red LED 17, which lights up for a short duration. Transistor amplifier TDC 7 also being off, it switches off the power transistor T1, so that no current passes through the solenoid 26 of the gas valve and the valve will prevent gas from leaving the container 3.

When the sensor heater warms up further, thereby increasing its resistance, the output of the comparator 28 increases from $V_{cs}$ and therefore the red LED 17 is extinguished. Power transistor T1 is now activated, so that solenoid 26 is energized, opening the gas valve and permitting gas to flow through the gas pipe from the container to the cooking range. The green LED 16 remains lit.

In case of a gas leak, the sensor output voltage increases as its resistance decreases. The higher voltage is applied to the non-inverting terminal 28' of the comparator 28, resulting in a decrease in output of the comparator to a value $V_{cd}<V_{cs}<V_{cn}$. The transistor amplifiers TDC 6 and TDC 7 will now be in the semi-off state and constitute large load resistances to the transistor TDC 5. Further, transistor amplifier TDC 6 being off, the red LED 17 will conduct current from the unregulated terminal 23 via resistor R4 and light up. Transistor amplifier TDC 7 also being off, power transistor T1 will also be off, so that the solenoid 26 of the gas valve is deenergized, closing the gas valve and shutting off the flow of gas through the gas pipe 4.

At the same time, the output $V_{cd}$ of the comparator 28 being small, this decrease is transmitted to the input 30 of the audio oscillator 31 via resistor R13, zener diode Z1 and capacitor C1 (FIG. 3), so that the oscillator is activated. The output of the oscillator is applied to the buzzer 19 on the control box via conductor 32, transistor amplifiers TDC1, TDC2 and TDC 4 (FIG. 4. It is seen that both visual alarm, red LED 17, and an audible alarm, buzzer 19, are activated when the gas supply from the gas container is shut off by reason of a gas leak. It must be noticed that even if the gas has been removed from the kitchen, both alarms continue to operate until the main switch 15 on the control box is manually turned off and then turned on again. Also, the green LED 16 remains extinguished by the signal from the audio oscillator 31 via transistor amplifier TDC 1 and resistor R1 (FIG. 4). To reiterate, even after removal of the leaked gas, the green LED 16 is extinguished, the red LED 17 is lit and the buzzer 19 keeps as long as the monitoring system has not been reset by means of the main switch 15.

Further, it is to be noticed that even if no gas leakage occurs, but the electric mains supply is interrupted for some reason, the power transistor T1 is off as there is no input at regulated terminal 23, so that the solenoid 26 remains deenergized and the gas valve remains closed thus preventing gas to leave the gas container. This is an important feature as in this way no gas leak can occur during interruption of the mains, which would not be detected by the system. The gas supply could be restored by connecting the power supply 12 of the control box 7 to a battery.

All electronic circuits described are integrated circuits which take up little space, so that they can be easily located in a control box of small dimensions.

As indicated above, when the power fails, the gas flow is terminated and the user may be without energy for an extended interval. In remote locations where obtaining restoration of power could be delayed, this can be a serious hardship. It would, of course, be possible to arrange a system of backup batteries and a recharger but these are often expensive and may not be reliable. Accordingly, the invention includes provision for a manual override of the safety system.

Figure 6:
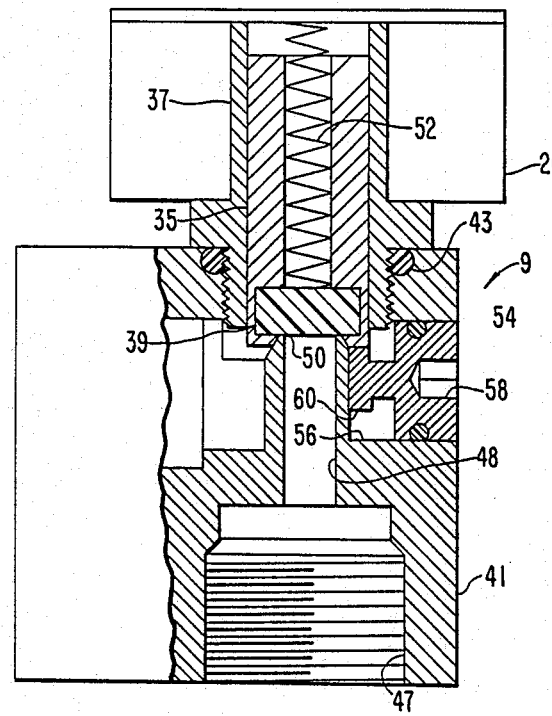
FIG. 6 is a side elevation, in section, of a solenoid valve and manual override screw in accordance with the invention with the valve closed.
Figure 7:
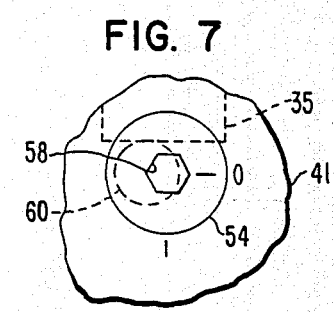
FIG. 7 is a fragmentary front elevation of the override screw.

This override in constructed as part of the solenoid and valve structure and is illustrated in FIGS. 6-9. As seen in FIGS. 6 and 7, the solenoid includes a coil 26 which, when energized, causes a plunger 35 to move axially within a generally tubular housing 37. Plunger 35 is a tubular body of magnetic material which carries at its lower end a body of elastomeric material 39 which acts as a valve member. Housing 37 is threadedly attached to an inlet-outlet body 41, the connection therebetween being sealed by an O-ring 43.

Body 41 has inlet means 45 to receive an inlet fitting connected to the tank or other source of gas under pressure and threaded outlet means 47 to receive an outlet fitting which is connected to the appliance using the gas. A passage 48 extends into body 41 coaxially with plunger 35 and terminates at a valve seat 50 which is covered by valve member 39 when the plunger is in the position shown in FIG. 6. A passage from inlet means 45 also reaches the region around the valve seat but there is no communication between the inlet means and the interior of passage 48 when the valve member 39 rests on the valve seat. Plunger 35 is urged to the position shown by a compression coil spring 52 and is moved upwardly against the force of the spring when solenoid coil 26 is electrically energized as described above.

The manual override includes a rotatable screw member which includes a cylindrical plug 54 rotatably received in a generally cylindrical recess 56 in body 41. The outer surface of plug 54 is penetrated by a non-circular recess 58 which is preferably hexagonal to receive an end of a hexagonal wrench. The inner end of plug 54 is formed with operator means comprising a circular cylindrical eccentric 60 the central axis of which is perpendicular to the central axis of plunger 35 and parallel with the central axis of plug 54 but offset therefrom. As best seen in FIG. 7, the periphery of eccentric 60 contacts a bottom surface of plunger 35 which extends below valve member 39.

Figure 8:
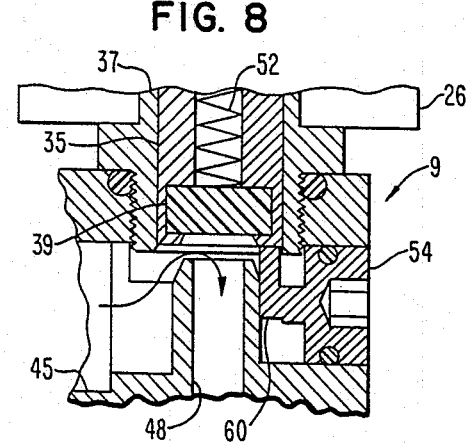
FIG. 8 is a partial side elevation, in section of the valve of FIG. 6 but with the valve manually moved to the open position.
Figure 9:
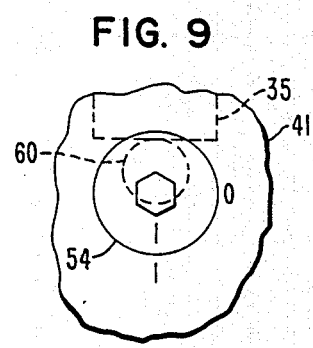
FIG. 9 is a fragmentary front elevation of the override screw in the position of FIG. 8.

To operate the manual override, an end of a hexagonal wrench is inserted in recess 58 and rotated clockwise (with reference to FIG. 7) about 90°, thereby rotating the plug and the eccentric 60 through the same angle. The plug can be provided with a scribe 62 adjacent recess 58 as an indicator of its rotational position and the outer surface of body 41 is preferably marked with reference letters or numbers such as the numbers 0 and 1 shown in FIGS. 7 and 9. The eccentric is oriented relative to the plug, as shown in FIGS. 7 and 9, so that its lobe of greatest eccentricity is opposite the scribe. Thus in the position of FIGS. 6 and 7, the eccentric may be in contact with the plunger but exerts no significant force thereon. However, as the plug is rotated clockwise so that the scribe approaches the 0 indicator, the eccentric pushes plunger 35 upwardly against the force of spring 52, lifting valve member 39 away from valve seat 50 as shown in FIGS. 8 and 9 and opening a flow path between inlet means 45 and outlet means 47 through passage 48. Gas will then flow between the tank and appliance without regard to the existence of power or leakage conditions. The manual override must, of course, be returned to the inactive position of FIGS. 6 and 7 when power is restored in order for the sensing circuits to perform their unctions.

Figure 10:
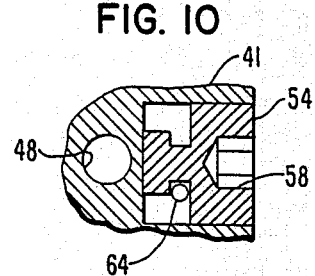
FIG. 10 is a transverse sectional view along line 10—10 of FIG. 6.

As seen in FIG. 10, a pin 64 is inserted into a hole in body 41 to prevent plug 54 from being forced outwardly. Also, the periphery of plug 54 is sealed against leakage by an O-ring 65.

Various changes may be made in the monitoring system described. For example, the system can be adapted to be operated by the car battery of a mobile home by providing a suitable transformer between the battery and the direct current power supply of the control box. Also, the system can be adapted to operate a ventilator to remove leaked gas after the gas supply has been shut off by the system. An additional alarm of some sort and located in a suitable place may be connected to the system. The same applies to an additional visual alarm. Further, the control box may be located in a place different from the sensor.

What is claimed is:

1. A gas monitoring system for detecting combustible gas in low concentration and shutting off the source of gas when a leak thereof is detected comprising the combination of gas valve means connected to control the flow of gas from said gas source to a consuming device, said gas valve means including a solenoid having an energized position for opening said valve means to allow gas flow and a deenergized position in which said valve means is urged toward a closed position to prevent gas flow;

valve means comprising a valve body;

a valve plunger slidable in said body, said valve plunger being movable by said solenoid to an open position when said solenoid is energized, said valve plunger carrying a valve member;

means defining a gas flow path;

a valve seat in said gas flow path; and spring means urging said valve plunger toward said closed position in which said valve member contacts said valve seat and closes said flow path;

a solid state switch for energizing and deenergized said solenoid;

a gas sensor for detecting the presence of leaked gas;

an integrated alarm circuit responsive to signals from said sensor to operate when said gas sensor senses leaked gas, said alarm circuit including a visual integrated alarm circuit, an audible integrated alarm circuit including an audio oscillator, integrated circuit driver circuits driving said audio oscillator, actuating said visual integrated alarm circuit, and causing said solid state switch to deenergize said solenoid when leaked gas is sensed, and an integrated circuit voltage comparator for driving said driver circuits;

circuit means for connecting the output of said sensor to the input of said integrated circuit voltage comparator;

a direct current power supply for said sensor and said integrated alarm circuit;

a switch for turning said power supply on and off; and manual override means for mechanically urging said valve means away from said closed position to allow gas flow without energization of said solenoid said override means comprising a plug having an axis and an eccentric member thereon eccentric to said axis; and means for rotatably supporting said plug adjacent said valve plunger, said plug being rotatable between a first position in which said eccentric member allows said plunger to move to said closed position and a second position in which said eccentric member moves said plunger away from said closed position against the force of said spring means, thereby separating said valve member from said seat and opening said path to gas flow.

2. A system according to claim 1 wherein said circuit means for connecting the output of said audio oscillator to said sensor comprises a transistor (T2).

3. A system according to claim 1 wherein said integrated circuit driver circuits include a pair of integrated transistors in Darlington connection.

4. A system according to claim 1 wherein said visual integrated alarm circuit includes at least one light emitting diode.

5. A system according to claim 1 wherein said audio oscillator is adapted to activate at least one audible alarm device.

6. A system according to claim 1 wherein one input of said integrated circuit voltage comparator is connected to the output of said power supply and the other input is connected to the output of said sensor, and wherein the output of said comparator is connected to said solid state switch, the output of said solid state switch being connected to said solenoid of said gas valve.

7. A system according to claim 1 and further including a hermetically sealed enclosure, said power supply and said integrated circuit alarm being housed in said enclosure.

* * * * *